US007038816B2

(12) United States Patent
Klassen et al.

(10) Patent No.: US 7,038,816 B2
(45) Date of Patent: May 2, 2006

(54) MACRO UNIFORMITY CORRECTION FOR X-Y SEPARABLE NON-UNIFORM

(75) Inventors: R. Victor Klassen, Webster, NY (US); Stephen C. Morgana, Brockport, NY (US); Robert P. Loce, Webster, NY (US); Michael Branciforte, Rochester, NY (US); Daniel R. Maurer, Fairport, NY (US); Michael J. Martin, Hamlin, NY (US); Robert M. Lofthus, Webster, NY (US)

(73) Assignee: Xerox Corporation, Stamford, CT (US)

( * ) Notice: Subject to any disclaimer, the term of this patent is extended or adjusted under 35 U.S.C. 154(b) by 271 days.

(21) Appl. No.: 10/812,545

(22) Filed: Mar. 29, 2004

(65) Prior Publication Data

US 2004/0179090 A1 Sep. 16, 2004

Related U.S. Application Data

(62) Division of application No. 09/738,573, filed on Dec. 15, 2000, now Pat. No. 6,760,056.

(51) Int. Cl.

*H04N 1/407* (2006.01)
*H04N 1/60* (2006.01)
*H04N 1/29* (2006.01)
*B41J 2/47* (2006.01)

(52) U.S. Cl. .................. 358/3.01; 358/3.23; 358/3.26; 358/406; 358/520; 358/300; 347/251

(58) Field of Classification Search ................ 358/1.9, 358/3.01, 3.21, 3.23, 3.26, 504, 519, 521, 358/406, 296, 300; 347/131, 240, 251–254
See application file for complete search history.

(56) References Cited

U.S. PATENT DOCUMENTS

| | | | | |
|---|---|---|---|---|
| 5,900,901 | A | 5/1999 | Costanza et al. | |
| 6,347,153 | B1 * | 2/2002 | Triplett et al. | 382/224 |
| 6,781,530 | B1 | 8/2004 | Moore | |
| 6,782,048 | B1 | 8/2004 | Santhoff | |
| 2003/0048478 | A1 * | 3/2003 | Cheng et al. | 358/519 |
| 2004/0179090 | A1 * | 9/2004 | Klassen et al. | 347/251 |
| 2005/0099446 | A1 * | 5/2005 | Mizes et al. | 347/19 |

* cited by examiner

*Primary Examiner*—Scott A. Rogers
(74) *Attorney, Agent, or Firm*—Lloyd F. Bean, II

(57) ABSTRACT

A method for rendering a raster output level determines an image position of a pixel of interest (POI) within an image. An intended raster output level, which corresponds to the POI, is received into a processing device. A final raster input level is determined as a function of the image position and the intended raster output level. The final input level and the image position are transmitted to an output device. An actual raster output level is rendered, via the output device, at a position on an output medium corresponding to the image position. The actual raster output level substantially matches the intended raster output level.

6 Claims, 12 Drawing Sheets

MACRO UNIFORMITY CORRECTION FOR X-Y SEPARABLE NON-UNIFORM

This is a divisional of U.S. application Ser. No. 09/738,573 filed Dec. 15, 2000 now U.S. Pat. No. 6,760,056, by the same inventors, and claims priority therefrom.

BACKGROUND OF THE INVENTION

The present invention relates to the art of digital imaging. It finds particular application in macro uniformity corrections for x-y separable non-uniformities in a raster output scanning (ROS) printing system and will be described with particular reference thereto. It will be appreciated, however, that the invention is also amenable to other like applications.

Macro non-uniformity levels have existed in raster scan image output terminals (IOTs) (e.g., xerographic printers) for some time and are a concern for most marking processes. Even small non-uniformity level errors in raster scan IOTs give rise to visually objectionable banding in halftone outputs (e.g., image macro non-uniformity streak artifacts). Such errors typically arise in raster scan image output terminals (IOTs) due to variations in ROS spot size across the field (which is constant in time (print to print)), donor-roll once-around, HSD wire hysteresis, laser diode variations, LED bar power variation, ROS scan line non-uniformity, photoreceptor belt sensitivity variations, and/or ROS velocity non-uniformity. Significantly, many variations occur only in the fast scan (e.g., X) or slow scan (e.g., Y) directions, and they do not interact to first order. Therefore, a correction made in one direction has a negligible effect on artifacts in the other direction. Other printing technologies (e.g. thermal inkjet and acoustical ink printing) also have artifacts that occur in a regular, predictable manner in one or both directions and fall within the scope of this discussion.

Although techniques have been proposed to eliminate such non-uniformity errors by making physical systems more uniform, it is too expensive to control or limit the error to an acceptable level, below which the error will not be detected by the unaided eye. Fixes have been attempted in the marking process, but not enough latitude exists to fully solve the problem. For problem sources such as LED non-uniformity, the correction is sometimes addressed with current control or pulse width control. However, none of the solutions discussed above implements a technique based in digital electronics. With the cost of computing rapidly decreasing, such digital electronics based solutions are becoming more attractive.

The present invention provides a new and improved apparatus and method which overcomes the above-referenced problems and others.

SUMMARY OF THE INVENTION

A method for rendering a raster output level determines an image position of a pixel of interest (POI) within an image. An intended raster output level, which corresponds to the POI, is received into a processing device. A final raster input level is determined as a function of the image position and the intended raster output level. The final input level and the image position are transmitted to an output device. An actual raster output level is rendered, via the output device, at a position on an output medium corresponding to the image position. The actual raster output level substantially matches the intended raster output level.

In accordance with one embodiment of the invention, a plurality of correction curves is computed for respective raster output levels. One of the correction curves is identified as a master correction curve. A scaling function is determined in accordance with relationships between the master correction curve and the other correction curves. The scaling function is used for producing the final raster input level.

In accordance with a more limited aspect of the invention, averages of actual output levels, which are produced by the output device for the raster output level of the master correction curve, are determined over a non-correctable direction at respective positions along a correctable direction of the output device. The correctable and non-correctable directions are substantially perpendicular. The relationships between the master correction curve and the other correction curves are determined as a function of the averages of the actual output levels.

In accordance with a more limited aspect of the invention, a plurality of tone reproduction curves is calibrated for one of the correction curves.

In accordance with a more limited aspect of the invention, the calibrating step includes, for each of the positions along the correctable direction, storing an identifier of the respective tone reproduction curve, which most closely achieves the final output level as a function of the respective position, in a lookup table.

In accordance with another aspect of the invention, the actual raster output level is printed.

In accordance with a more limited aspect of the invention, the actual raster output level is printed on a xerographic color printing device.

One advantage of the present invention is that it may reduce the number of tone reproduction curves necessary for correcting macro non-uniformities (as compared to a case where different tone reproduction curves are applied for each row or column of pixels or a case if one tone reproduction curve is stored uniquely for each pixel).

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION

Figure 1:
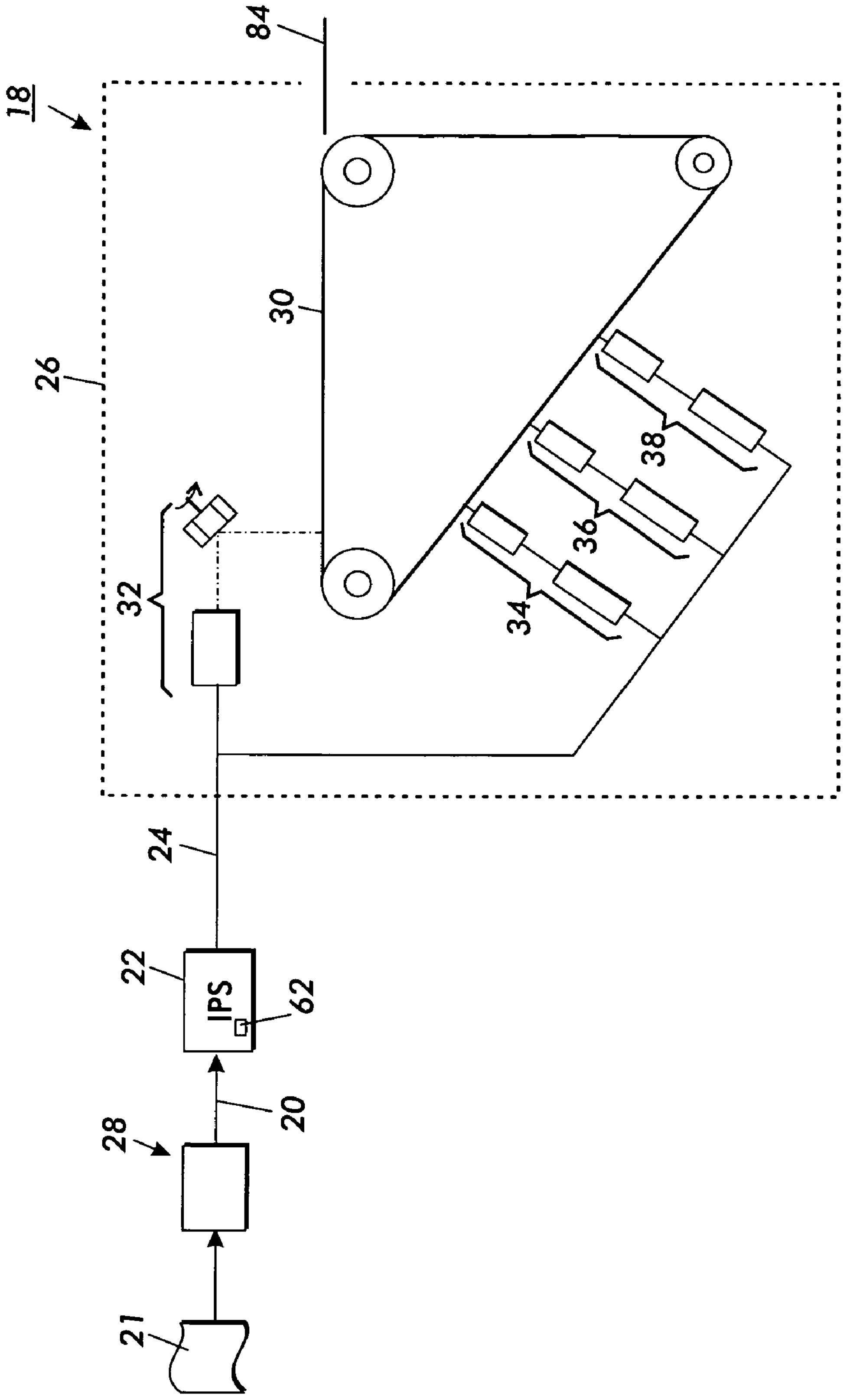
FIG. 1 illustrates a generalized representation of a suitable system level embodiment for one or more aspects of the present invention.
Figure 2:
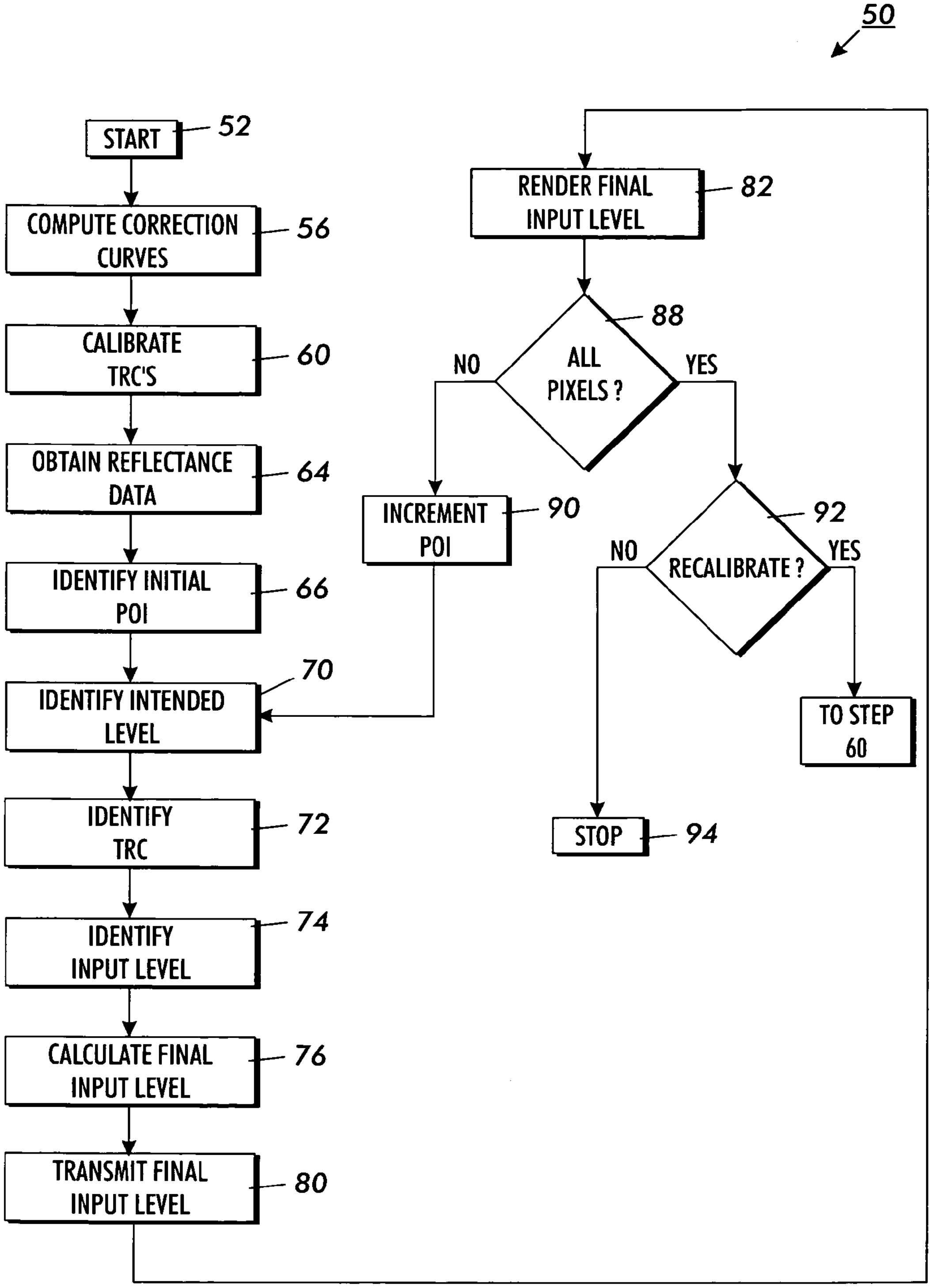
FIG. 2 illustrates a flowchart for a pre-compensation process according to the present invention.
Figure 3A:
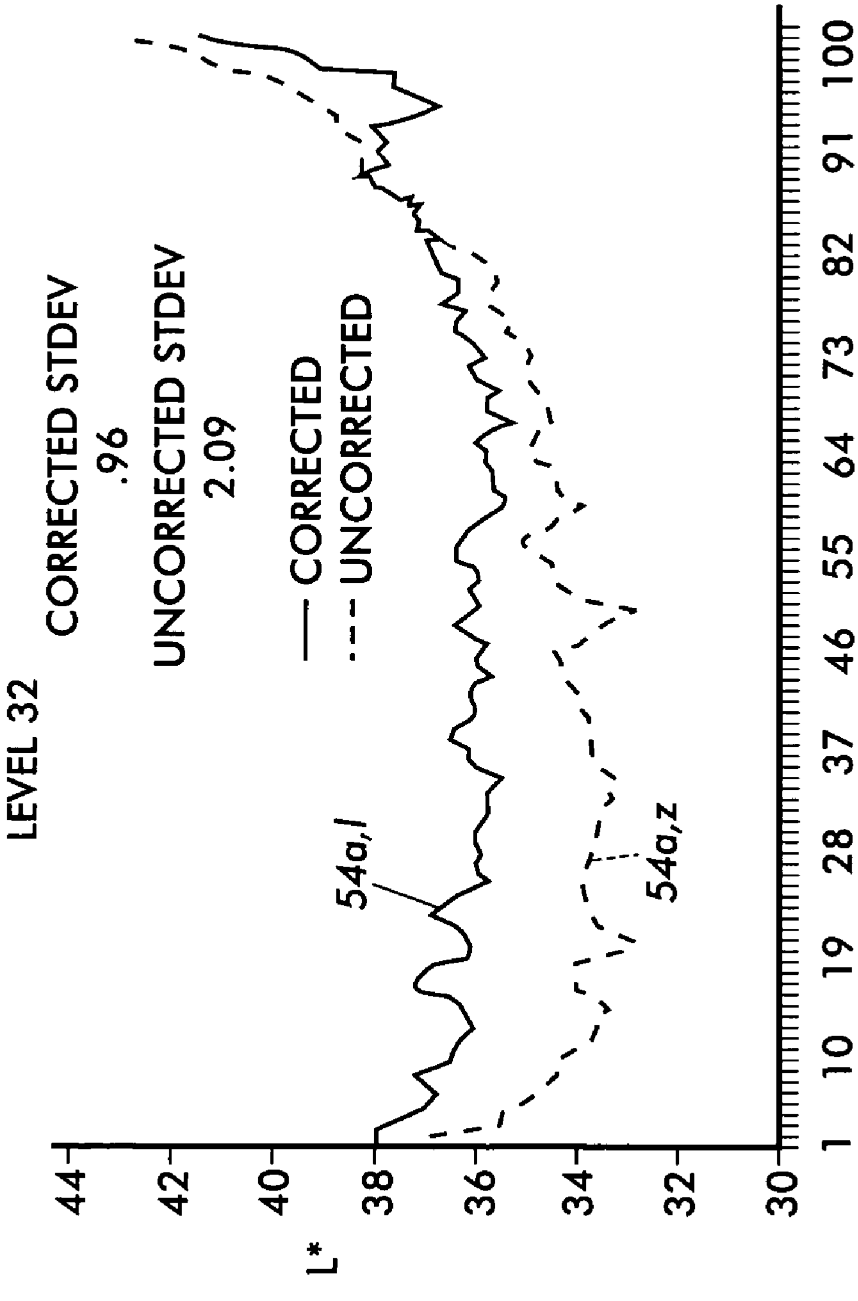
FIGS. 3A, 3B, 3C, 3D, 3E, 3F, and 3G illustrate correction curves.
Figure 3B:
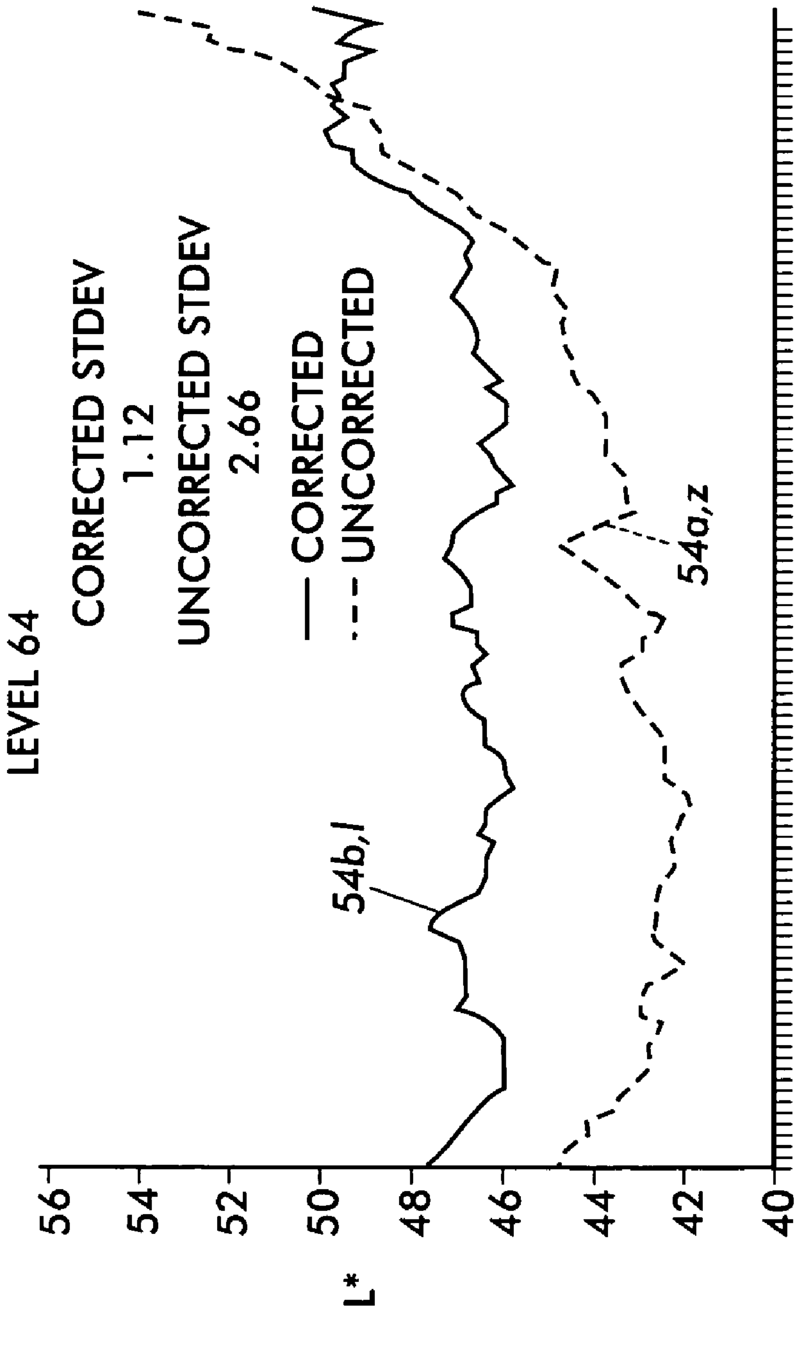
Figure 3C:
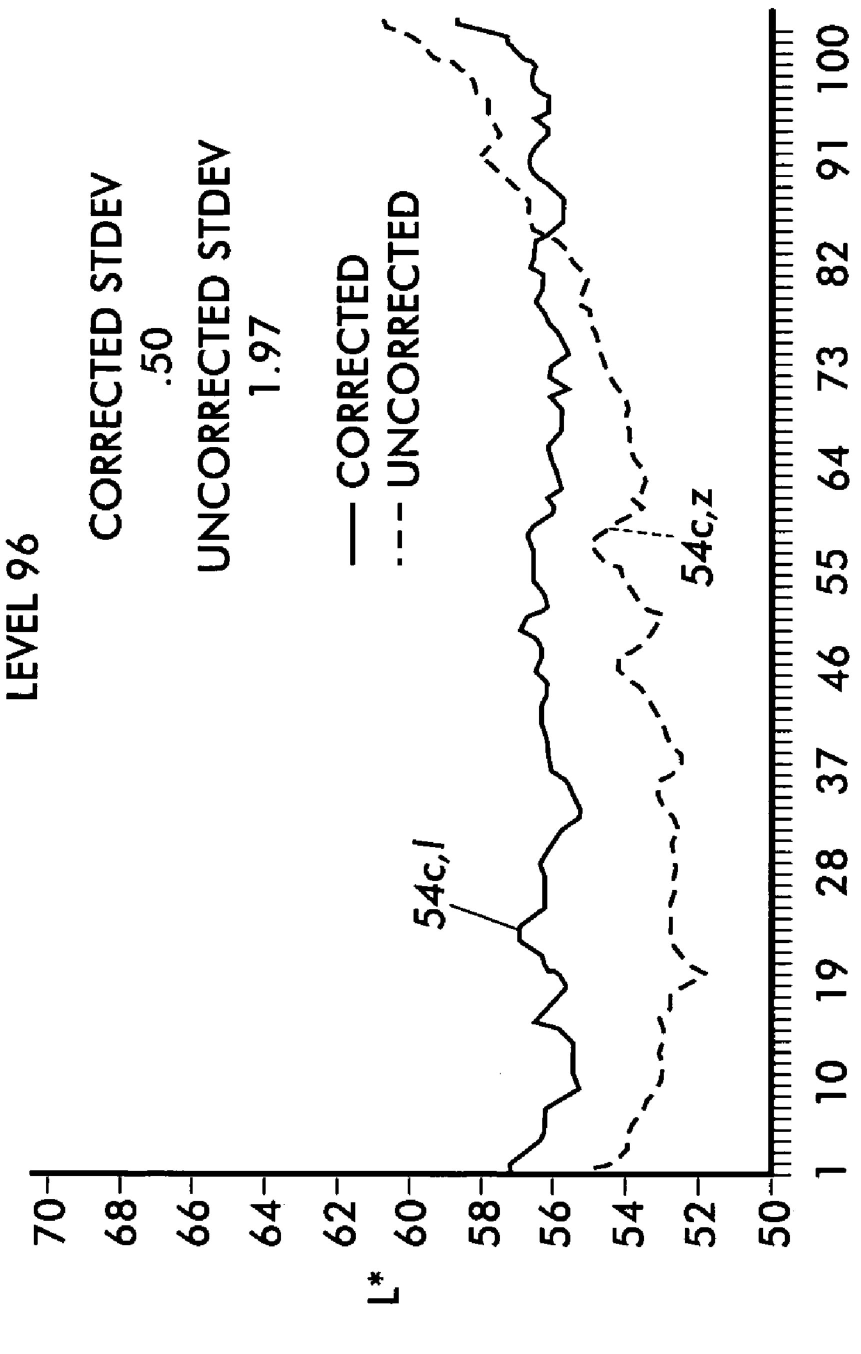
Figure 3D:
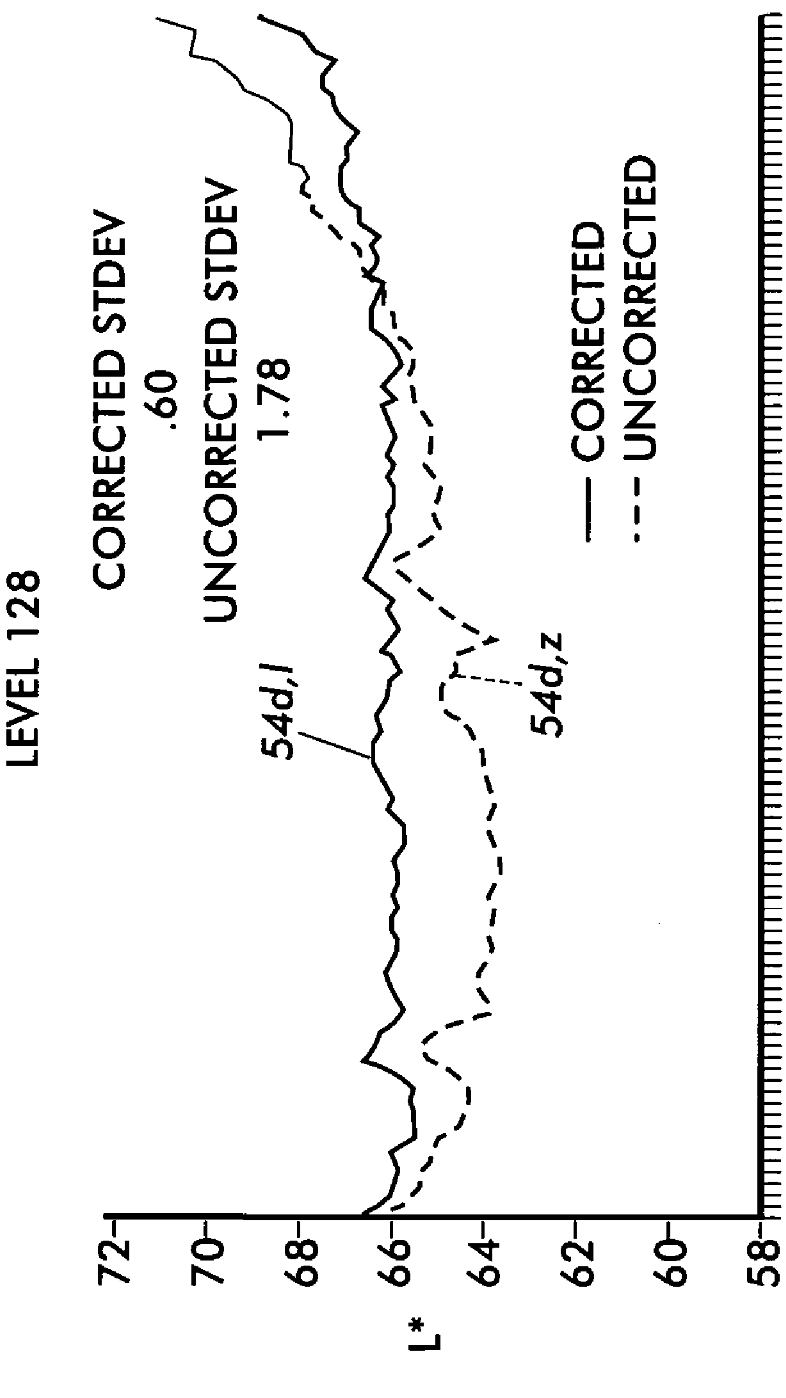
Figure 3E:
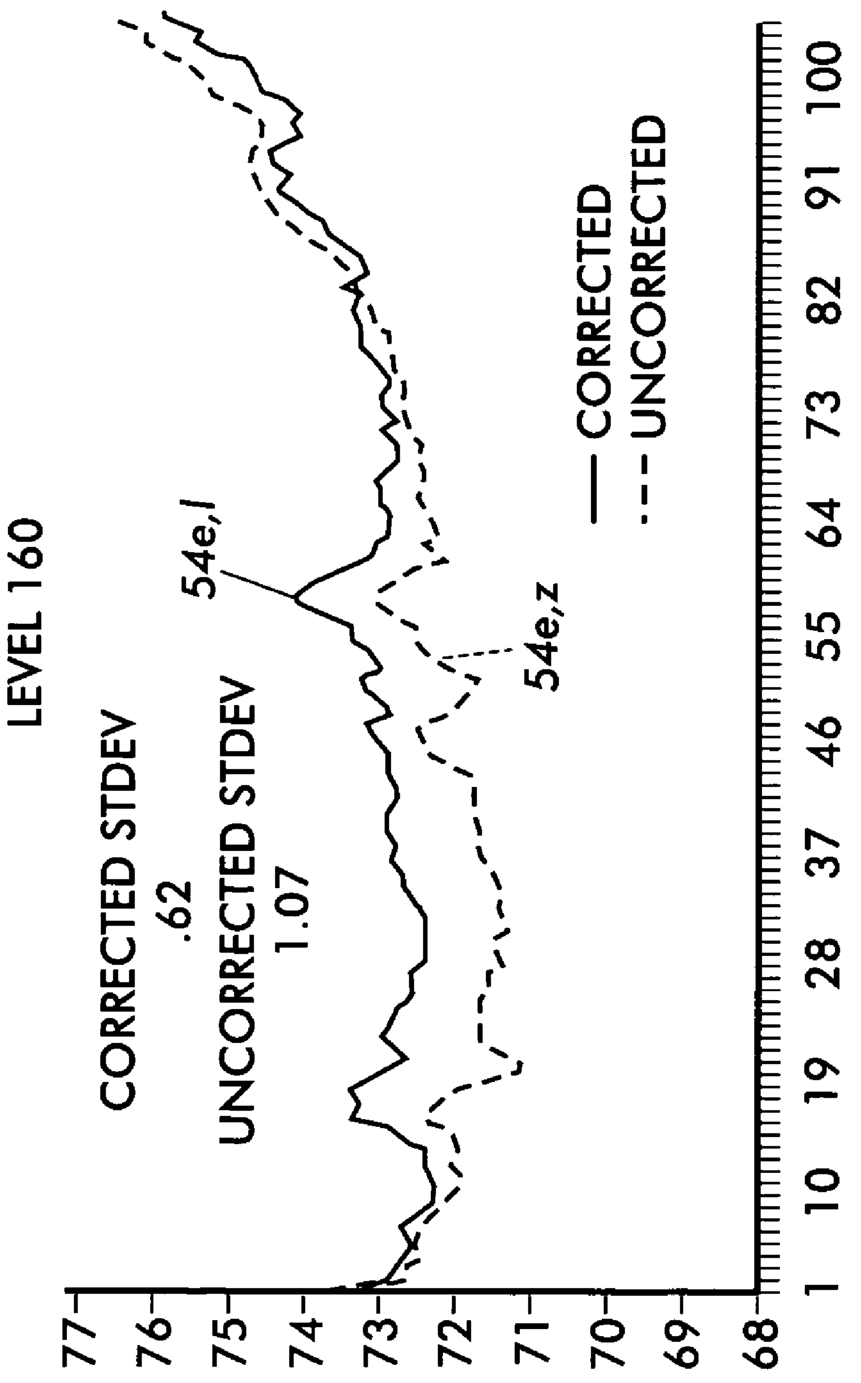
Figure 3F:
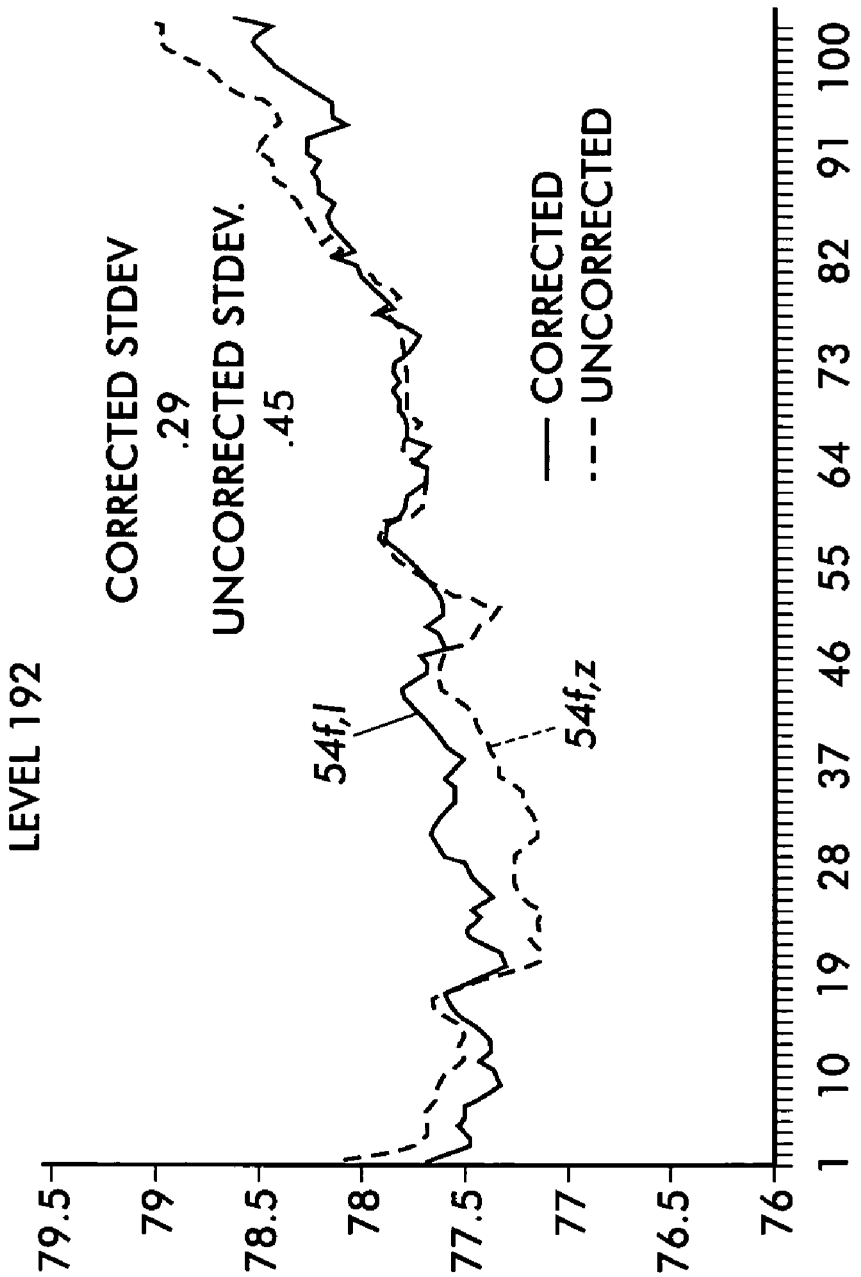
Figure 3G:
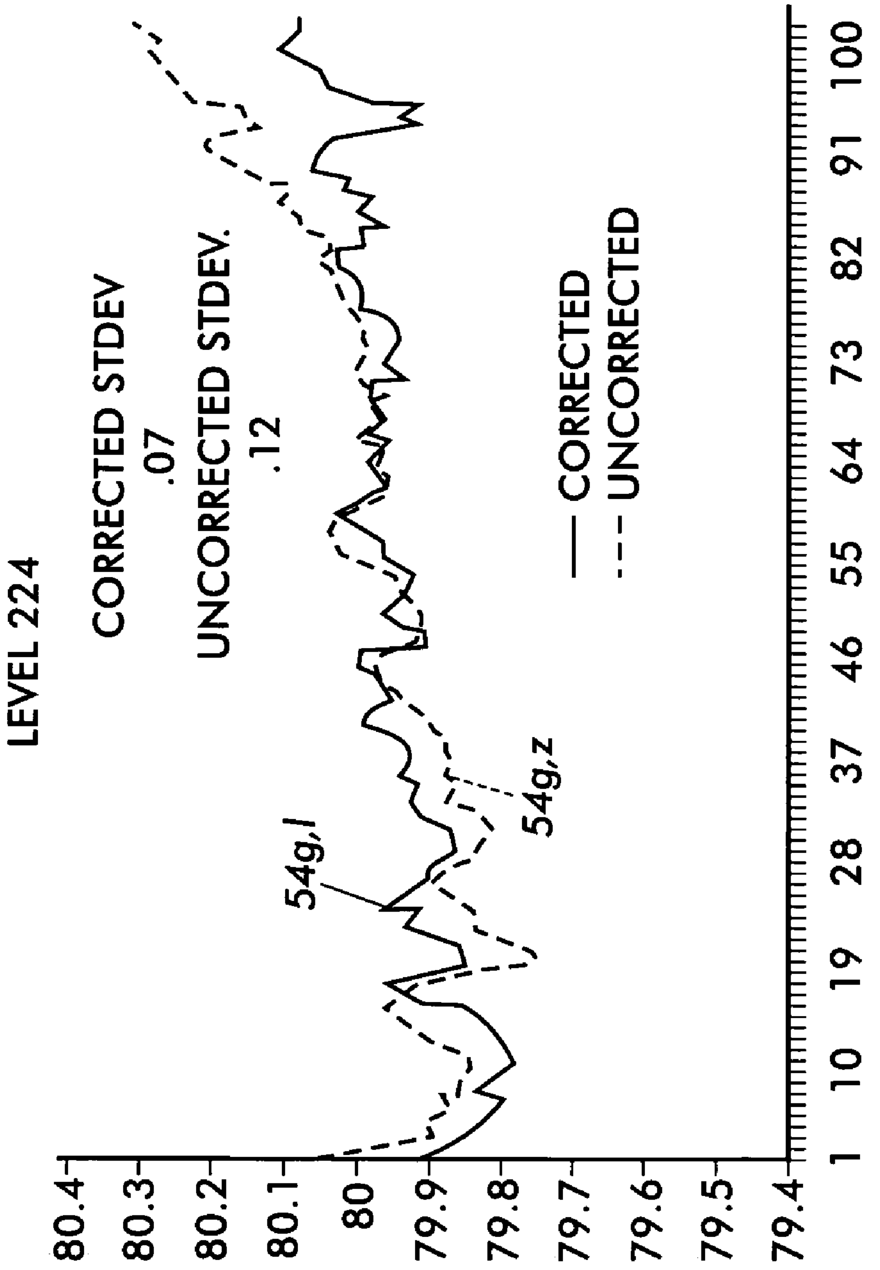

Tone Reproduction Curves (TRCs) are commonly known in the art as a means for compensating for device non-linearities, i.e. devices that produce output levels that are not linearly proportional to the input levels specified. For example, a device might produce output levels 0, 3, 15, 35, 63, 99, etc. in response to input levels 0, 31, 63, 95, 127, 159, etc. For such a machine, one would construct a TRC that contains the value 63 in cell 15, the value 95 in cell 35, and 127 in cell 63, with appropriately interpolated values in between. As commonly practiced, a single TRC is used to correct all pixels of a page image. The correction applied to each pixel depends only on the input value for that pixel.

In the present invention, the correction applied to each pixel depends not only on the input value for that pixel but on the row or column address of the pixel. The invention may be applied to all rows equally in order to correct column-to-column variation, or it may be applied to all columns equally in order to correct row-to-row variation. It may also be applied to both rows and columns in order to correct both kinds of variation. While it may be applied in both directions in succession, for ease of description we will refer to the direction being corrected in a given pass as the correctable direction, and the other direction as the non-correctable direction.

Turning now to FIG. 1, there is shown an embodiment of a digital imaging system 18 that incorporates the features of the present invention. Image data 20 representing an image 21 to be printed is received by an image processing system (IPS) 22 that may incorporate what is known in the art as a digital front end (DFE). The IPS 22 processes the received image data 20 to produce print ready data 24 that is supplied to an output device 26 (e.g., a print engine). It is to be understood that the output device 26 may be a color xerographic printer. The IPS 22 may receive image data 20 from a sensor (e.g., an input scanner) 28, which captures an image from an original document, a computer, a network, or any similar or equivalent image input terminal communicating with the IPS 22.

The print engine 26 is beneficially an electrophotographic engine; however, it will become evident from the following discussion that the present invention is useful in a wide variety of digital copying and printing machines and is not limited in its application to the printing machine shown herein. The print engine 26 is illustrated as incorporating a ROS lens system 32 and three (3) array systems 34, 36, 38 for producing color. The engine 26, which operates on the print ready binary data from the IPS 22 to generate a color document in a single pass, selectively charges a photoreceptive surface in the form of a photoreceptor belt 30. Briefly, the uniformly charged photoreceptor 30 is initially exposed to a light image which represents a first color image separation, such as black, at the ROS 32. The resulting electrostatic latent image is then developed with black toner particles to produce a black toner image. This same image area with its black toner layer is then recharged, exposed to a light image which represents a second color separation such as yellow at the array lens 34, and developed to produce a second color toner layer. This recharge, expose, and develop image on image (REaD lol) process may be repeated at the array lens 36, and the array lens 38 to subsequently develop image layers of different colors, such as magenta and cyan.

Referring now to FIGS. 1, 2, 3A, 3B, 3C, 3D, 3E, 3F, and 3G, a pre-compensation process 50 for correcting spatial non-uniformities within the image 21 begins in a step 52.

As a first step in computing a TRC per pixel, correction curves $\mathbf{54}_{a,1}$, $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$ are computed in a step 56. More specifically, with reference to FIGS. 3A, 3B, 3C, 3D, 3E, 3F, and 3G, output pages of, for example, seven (7) different raster output levels (e.g., 32, 64, 96, 128, 160, 192, and 224) are produced and scanned. Scan rows are then averaged along a non-correctable direction, thereby giving a mapping from location to average measured reflectance as a function of respective positions along a correctable direction on the page. The error at each location is expressed as a fraction of the average value. In this manner, the fractional reciprocals represent respective correction values as a function of position in the first direction, for each of the measured levels (see the correction curves $\mathbf{54}_{a,1}$, $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$).

Figure 4:
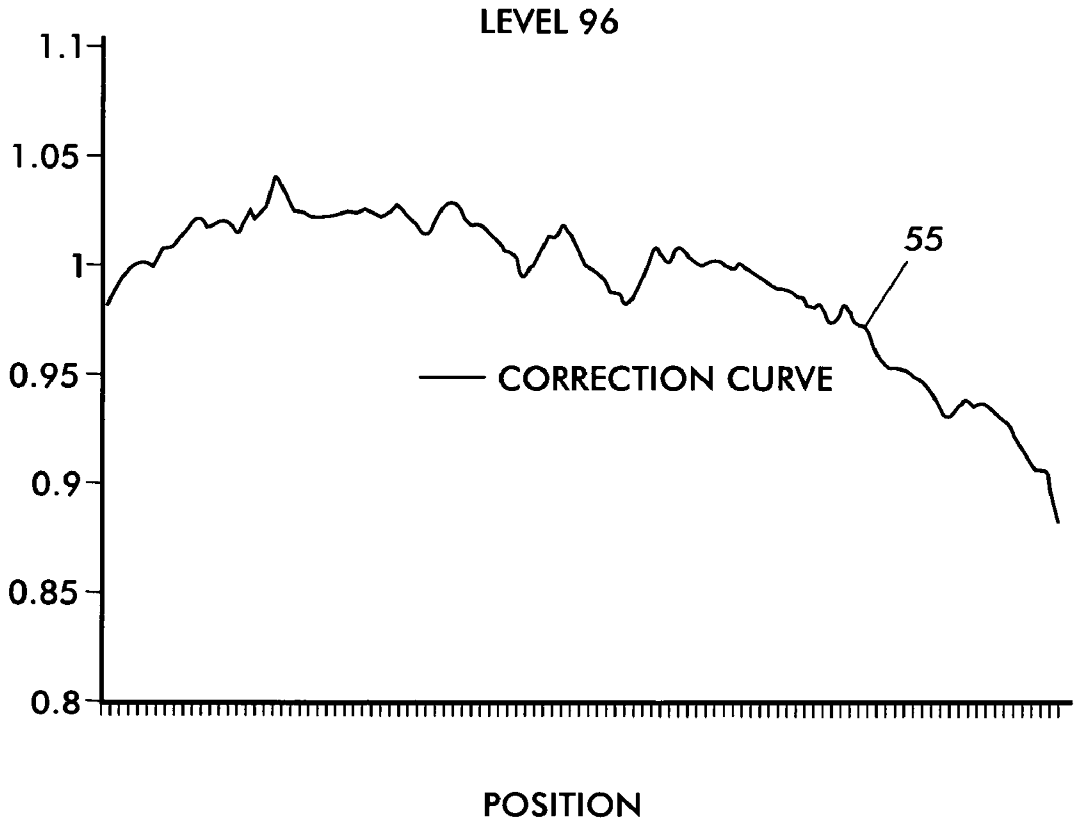
FIG. 4 illustrates an example of a correction curve.

It is observed that the curves $\mathbf{54}_{a,1}$, $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$, when each is expressed as a fraction of the average value, appear to be scaled versions of each other. That is, the amount of correction at any given location is equal to the amount of correction at that location for one representative curve, times a scale factor that depends only on the input level and not on the location. FIG. 4 contains an example of a correction curve, computed as the ratio of the average measured value and the measured value at a given position.

A representative curve R(x) is selected from the set of correction curves and for each other curve, a scale factor is computed that minimizes the difference between the scaled curve and the representative curve. The best choice for the representative curve is the one for which the sum of these differences is minimized. Given a representative curve and the corresponding set of scale factors a smooth function S(I) may be fit through the set of scale factors, providing the scale as a function of input intensity. The correction to be applied to a pixel of intensity I at location x is then S(I)R(x).

In one embodiment, one might store S(I) and R(x) as lookup tables, and multiply the values together on the fly as needed. However, in a typical system there will only be a relatively small number of distinct values that R(x) takes on, and so the multiplication can be computed in advance, for each of these values. In the preferred embodiment, a series of TRCs $S_j(I)$ are computed and stored, and the values of j as a function of position are stored as well. The correction step is then, given the position x, determine the value j associated with position x, and select a TRC $S_j(I)$. The value to output is then the value in location I of the TRC $S_j(I)$. Although the scaling is achieved in the preferred embodiment by multiplication operations, it is also contemplated to scale via offsetting (i.e., addition operations).

Figure 5:
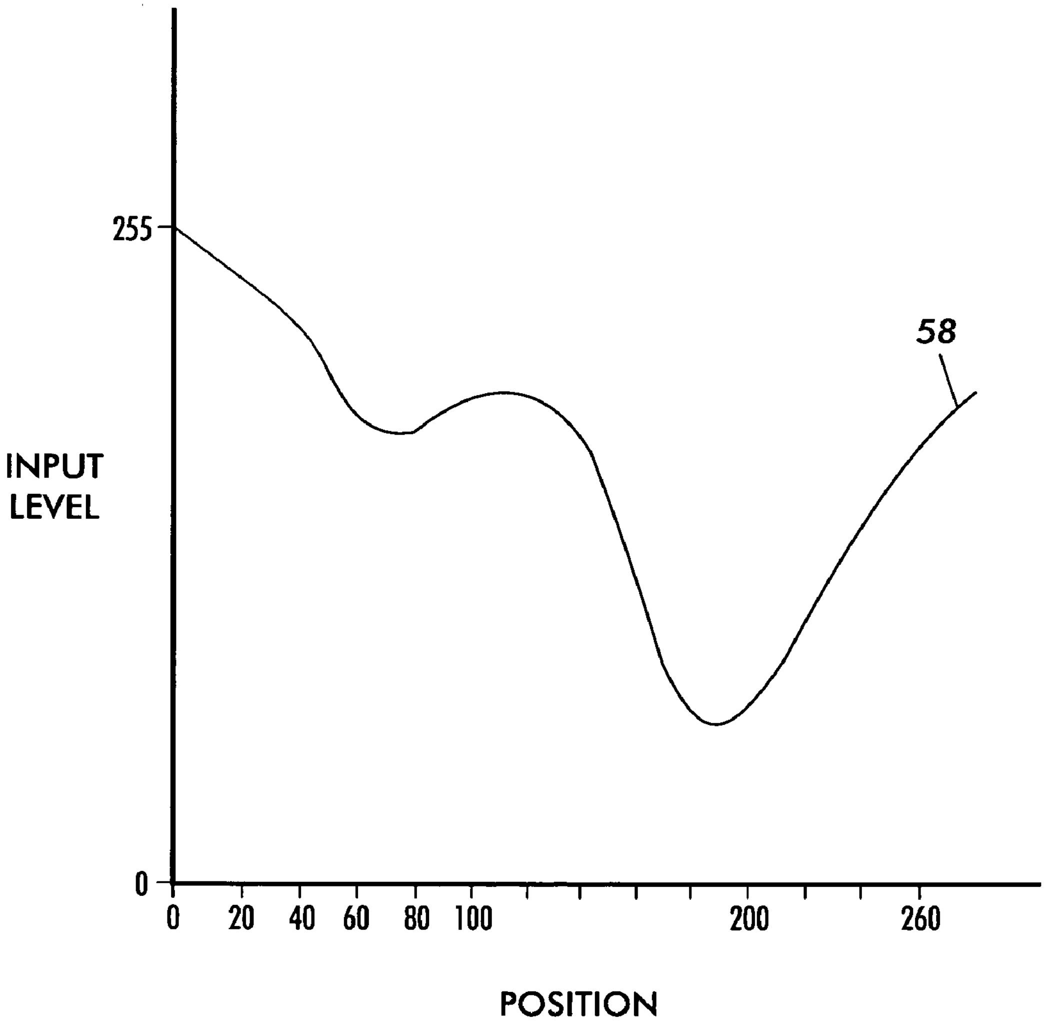
FIG. 5 illustrates an exemplary tone reproduction curve.

Curves $\mathbf{54}_{a,2}$, $\mathbf{54}_{b,2}$, $\mathbf{54}_{c,2}$, $\mathbf{54}_{d,2}$, $\mathbf{54}_{e,2}$, $\mathbf{54}_{f,2}$, $\mathbf{54}_{g,2}$ are examples of a range of luminances versus position after the $\mathbf{54}_{a,1}$, $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$, respectively, are corrected as a function of the correction values. Tone reproduction curves (TRCs) (see FIG. 5 for an exemplary TRC 58) are calibrated, in a step 60, for one of the correction curves $\mathbf{54}_{a,1}$, $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$. It is to be understood that calibration may be performed using various scheduling strategies that would depend upon the temporal fluctuation of the marking process. Two limits are as follows: (1) static mode, where a single one-time calibration is performed during set up; and (2) real-time mode, where calibration prints are generated and sensed within the printer at high rates, possibly nearing the print rate. The calibration process could be based on direct measurement of a TRC or the measurement could be indirect and utilized via a known relationship to TRCs. Two examples of indirect measurement and TRC selection are: (1) measurements of spot size and inference of a printed TRC; and (2) measurement of developed toner patches on a photoreceptor and inference of a printed TRC.

Figure 6:
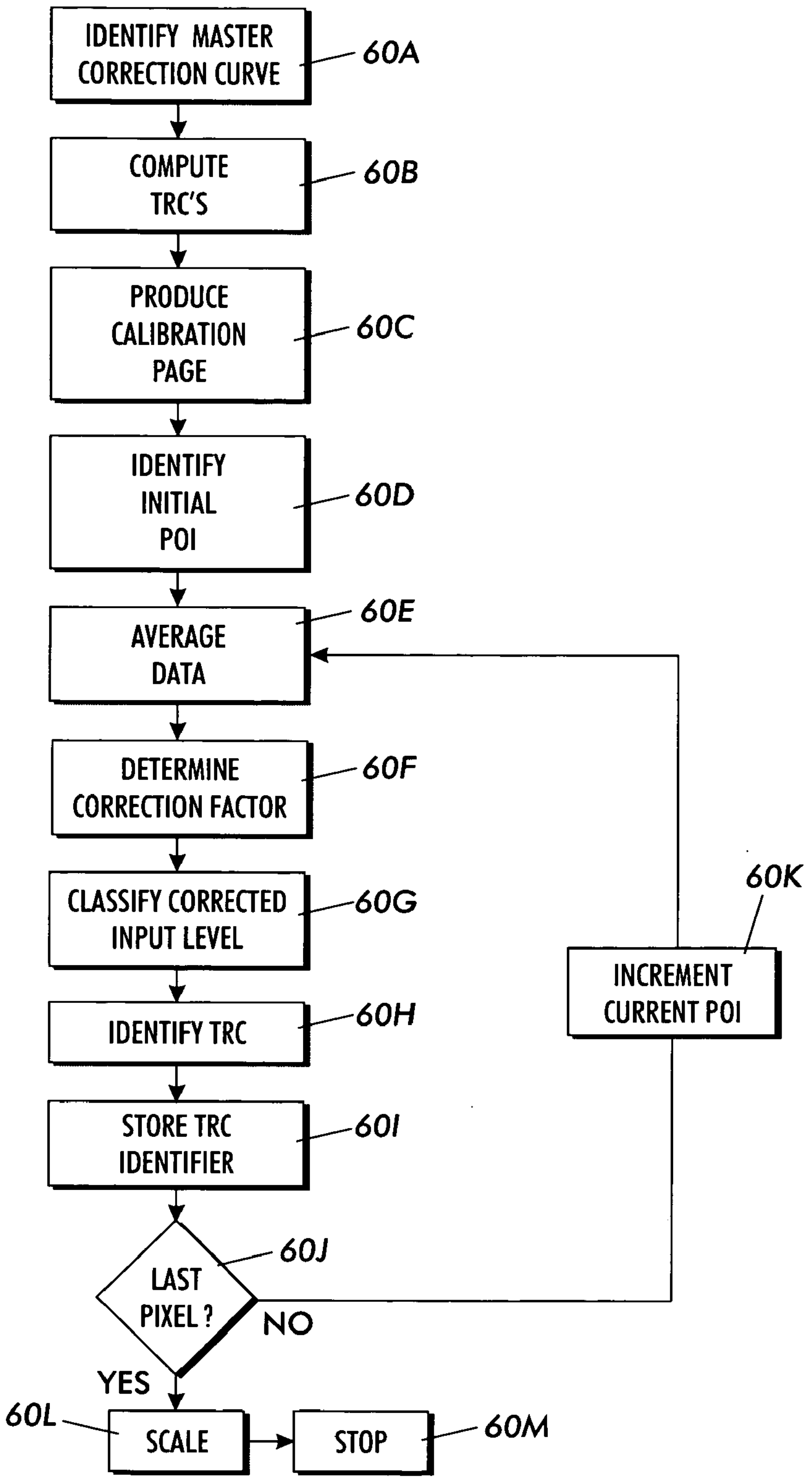
FIG. 6 illustrates a flowchart for calibrating tone reproduction curves according to the present invention.

The step 60 of calibrating the TRCs is described in detail with reference to FIG. 6. With reference to FIGS. 3A, 3B, 3C, 3D, 3E, 3F, 3G, and 6, one of the correction curves $\mathbf{54}_{a,1}$, $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$ is identified, in a step 60A, as a master correction curve. Preferably, the most representative correction curve is used as the master correction curve. For example, the root-mean-square difference between the selected master curve and optimally scaled versions of the other curves might be minimized. Because the correction curve $\mathbf{54}_{a,1}$ is the most representative, the correction curve $\mathbf{54}_{a,1}$ is selected in the step 60A as the master correction curve.

TRCs are computed in a step 60B. One of the TRCs represents the most extreme change for achieving a darker reflectance output, while another one of the TRCs represents the most extreme change for achieving a lighter reflectance output. The remaining TRCs represent uniform steps (subranges) between the dark and light reflectance extremes. In the preferred embodiment, sixteen (16) TRCs are calibrated for the master correction curve.

A calibration page of constant level, which corresponds to the level of the master correction curve $\mathbf{54}_{a,1}$, is produced by the output device 26 in a step 60C. The calibration page is scanned into the IPS 22 using, for example, the scanning device 28. The IPS 22 begins processing the image data representative of the calibration page by identifying, in a step 60D, an initial position (pixel) within the image data as a current position (pixel of interest (POI)) to be processed. Then, in a step 60E, the IPS 22 averages the image data at the current POI of the calibration page over a non-correctable direction of the output device 26. For example, if the output produced by the device 26 may be corrected in the x-direction, the image data is averaged over the y-direction. Because there are many pixels in a single column of constant x, the average may be computed to high precision.

A correction factor for the current POI is determined in a step 60F. For example, the averaged output over the non-correctable direction may be 33. Since the output level associated with the master correction curve $\mathbf{54}_{a,1}$ is 32, the correction factor is determined in the step 60F to be 32/33. More specifically, since the averaged output (e.g., 33) at the current POI is greater than the output (e.g., 32) associated with the master correction curve $\mathbf{54}_{a,1}$, it is determined that the image data transmitted to the output device 26 for the current POI should be multiplied (corrected) by a factor of 32/33 (i.e., the corrected input at the current POI for achieving an output level of 32 is (32/33)*32=31.03). The corrected input level (e.g., 31.03) is classified, in a step 60G, so that the TRC that produces an input level closest to the corrected input level (e.g., 31.03) for the current POI is identified by a TRC identifier, in a step 60H. The TRC identifier is stored in a memory device (e.g., a lookup table) 62, which is preferably included within the IPS 22, in a step 601.

A determination is made in a step 60J whether the last pixel within the image has been processed. If the last pixel within the image has not been processed, control passes to a step 60K, which sets the current POI to the next pixel along the correctable direction of the output device 26; control then returns to the step 60E for averaging the image data along the non-correctable direction at the current POI. If, on the other hand, all the image data has been processed, control passes to a step 60L.

In the step 60L, a scaling function is determined in accordance with relationships between the master correction curve $\mathbf{54}_{a,1}$ and the other correction curves $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$. Based on experience, the inventors have found that the relationships between the master correction curve $\mathbf{54}_{a,1}$ and the other correction curves $\mathbf{54}_{b,1}$, $\mathbf{54}_{c,1}$, $\mathbf{54}_{d,1}$, $\mathbf{54}_{e,1}$, $\mathbf{54}_{f,1}$, $\mathbf{54}_{g,1}$ are preferably represented using a cubic scaling function. However, it is to be understood that other scaling functions are also contemplated.

The process of calibrating the TRCs ends in a step 60M.

With reference again to FIG. 2, after the TRCs are calibrated, control passes to a step 64 for obtaining reflectance data of the image 21 to be produced using the output device 26. Once the reflectance image data is obtained, a first pixel is identified, in a step 66, as a current POI within the image data. An intended (desired) raster output level (reflectance) is identified, in a step 70, for the current POI.

The coordinate (e.g., the x-coordinate), which represents the dimension capable of being corrected, of the position (x,y) of the current POI is used as a key for identifying, in a step 72, one of the TRC identifiers within the look-up table. Then, a raster input level is determined, in a step 74, as a function of the TRC identifier and the correctable dimension of the position of the current POI. For example, the input level is identified as a parameter of the TRC according to I(i,j)=TRC[O(i,j); i,j], where I(i,j) represents the input level and O(i,j) represents the intended raster output level at the position (i,j). It is to be understood that while I(i,j) references a TRC based on an input pixel value and the current spatial location, the location could possess a two-dimensional spatial dependence or could be one-dimensional to correct for one-dimensional problems (e.g., streaks). In another embodiment, the input level is identified in the step 74 as a function of I(i,j)=TRC[O(i,j); C(i,j)], where C(i,j) is a classifier identified as a function of the position (i,j). Since a compensation signal may fall into a very small number of classes (e.g., sixteen (16)), the operation may be indexed by a number less than the number of spatial locations.

Optionally, a final raster input level is calculated, in a step 76, by scaling the input level in accordance with the scaling function and the intended output level. If the input level is not scaled, it is assumed that the final raster input level is the raster input level determined in the step 74.

In the step 80, the final raster input level is transmitted to the output device 26. Then, in a step 82, the final raster input level is rendered on an output medium 84 as a raster output level by the output device 26. In the preferred embodiment, the output device 26 is a color printing device (e.g., a color printer or color facsimile machine); however, other types of output devices are also contemplated. It is to be understood that the raster output level is rendered at a position on the output medium corresponding to the position of the current POI. Furthermore, the raster output level produced by the output device 26 substantially matches the intended raster output level.

A determination is made, in a step 88, whether all the pixels in the image data have been processed. If all the pixels have not been processed, control passes to a step 90, which increments the current POI to the next pixel along the correctable dimension of the output device 26. Then, control is returned to the step 70 for determining the intended output level of the current POI. Alternatively, if no more pixels are left to be processed, control passes to a step 92 for determining whether to recalibrate the system 18. It is to be understood that the frequency at which the system 18 is recalibrated is dependent on the system usage. For example, it may be desirable to recalibrate the system after a predetermined number of pages are processed.

If it is desirable to recalibrate the system, control returns to the step 60; otherwise, control passes to a step 94 for stopping the process.

In another embodiment, it is also contemplated to apply a compensation means to the analog video signal, such that power of the signal drives the laser (e.g., a light emitting diode or a current applied to an ink-jet device). Instead of adjusting the input digital image to compensate for a ROS spot-size signature, the laser power is increased or decreased according to the position of the laser spot relative to the optical imperfections. For instance, if the spot size increases, then an appropriate increase in laser power may correct the exposure, and vice versa. A compensation TRC in this context drives a variable gain amplifier. A correction table may modulate the ROS laser power based on the field position of the laser spot. Note that the digital and analog methods may be combined, to gain additional degrees of freedom in generating compensated signals.

It is to be understood that in many common imaging devices the raster input levels are halftoned prior to actually driving the imaging device.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A system for correcting raster data for spatial non-uniformities within an image, comprising:

a sensor for detecting a plurality of the raster data as a function of respective positions within the image;

a processor, which receives the raster data from the sensor, for processing the raster data to correct the spatial non-uniformities in the image; and a memory device for storing a set of tone reproduction curves, respective ones of the tone reproduction curves being accessed by the processor as a function of the positions of the raster data for generating respective correction values to compensate for the non-uniformities, the processor applying the correction values to the respective raster data for generating corrected raster data.

2. The system for correcting raster data as set forth in claim 1, wherein the memory device includes:

a correction lookup table indexing the tone reproduction curves as a function of the respective positions within the image.

3. The system for correcting raster data as set forth in claim 1, wherein the raster data represents reflectance, a number of reflectance sub-ranges being defined between a minimum reflectance and a maximum reflectance, each of the reflectances in the raster data being included within one of the reflectance sub-ranges, each of the tone reproduction curves representing one of the reflectance sub-ranges.

4. The system for correcting raster data as set forth in claim 3, wherein sixteen (16) sub-ranges are defined between the minimum reflectance and the maximum reflectance.

5. The system for correcting raster data as set forth in claim 1, further including:

an output device for rendering the corrected raster data.

6. The system for correcting raster data as set forth in claim 5, wherein the output device includes a color printing device.

* * * * *